No. 614,423. Patented Nov. 15, 1898.
C. DOBSON.
APPARATUS FOR MOLDING DOUGH.
(Application filed Aug. 20, 1898.)

(No Model.)

Witnesses
Geo. E. Fuch.
B. E. Seitz

Inventor
Christopher Dobson
by Herbert Peck
Atty

UNITED STATES PATENT OFFICE.

CHRISTOPHER DOBSON, OF KIRKHAM, ENGLAND, ASSIGNOR TO ROBERT KENNETH BALCARRAS, OF MANCHESTER, ENGLAND.

APPARATUS FOR MOLDING DOUGH.

SPECIFICATION forming part of Letters Patent No. 614,423, dated November 15, 1898.

Application filed August 20, 1898. Serial No. 689,090. (No model.)

*To all whom it may concern:*

Be it known that I, CHRISTOPHER DOBSON, a subject of the Queen of Great Britain and Ireland, residing at Kirkham, in the county of Lancaster, England, have invented Improvements in Apparatus for Molding Dough, of which the following is a specification.

This invention has reference to apparatus whereby dough can be molded into sheets and such sheets can be coiled and pressed into solid rolls by the action of rollers which are so arranged as to form a coiling space or cavity and one of which is weighted and adapted to rise and fall, so as to vary the pressure exerted upon the rolls of dough produced.

Figure 1:
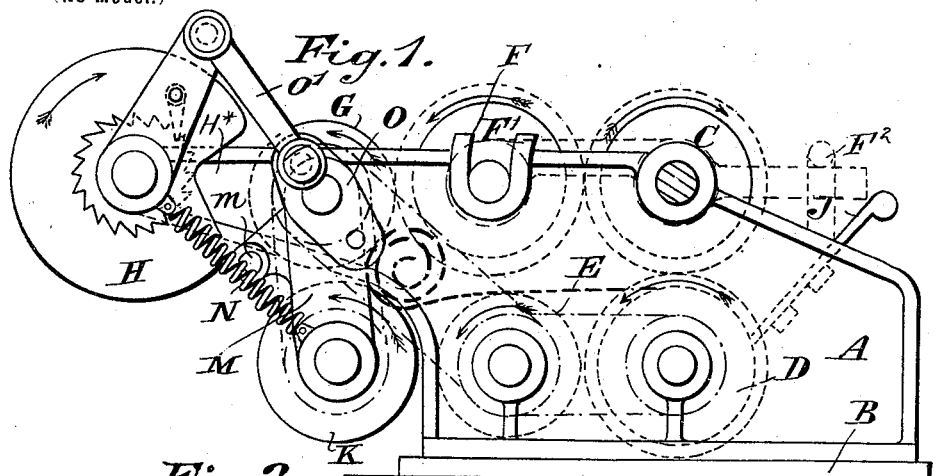
Figure 2:
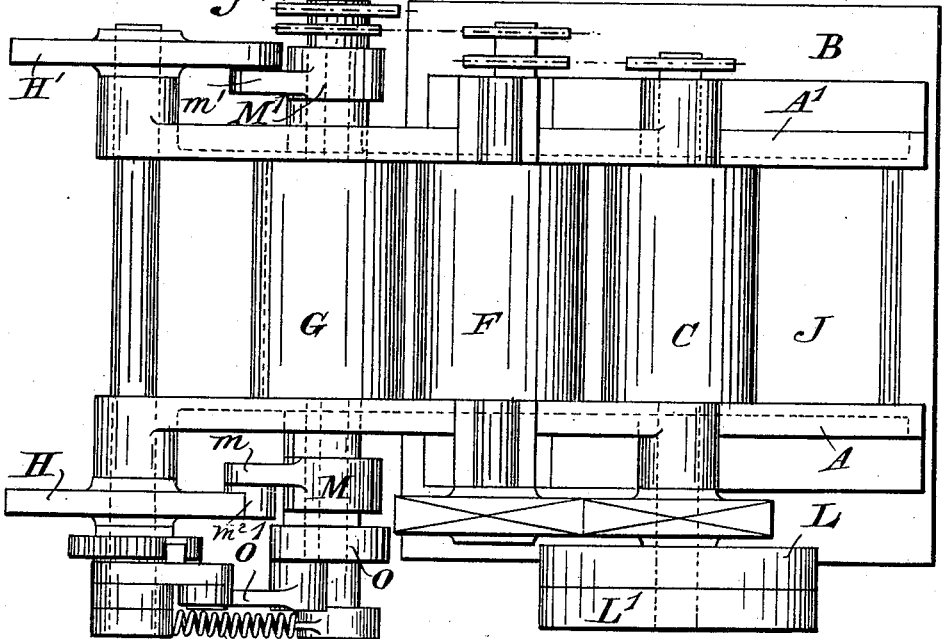
Figure 3:
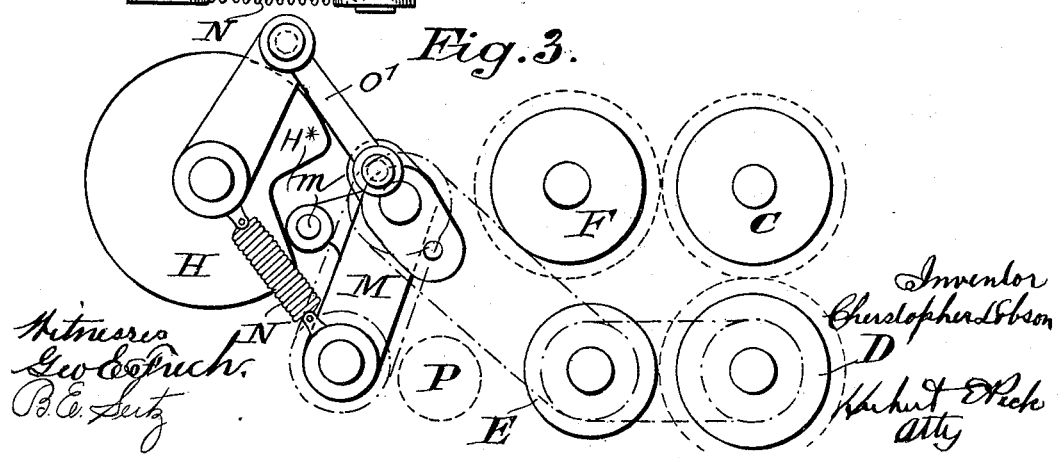

Figures 1 and 2 of the accompanying illustrative drawings show, respectively in side elevation and plan, one construction of dough-molding apparatus according to this invention. Fig. 3 is an elevation of the apparatus with the framing omitted, illustrating the automatic discharge of the molded roll of dough.

The trough-like framing of the apparatus consists of two side plates, as A A', and a bottom plate B, preferably of cast-iron. The bearings for the shafts carrying the rollers C, D, E, F, and G and for the shaft carrying the cams H H' are formed in the side plates A A', as illustrated.

The roller F is made of a suitable weight and vertically adjustable. For the latter purpose the bearings F' of the shaft carrying the said roller F are open at the top, while the sides thereof are of circular form, being struck with radii from the center of the bearings carrying the roller C.

Instead of supporting the roller F by open top and circular bearings, as hereinbefore described, I sometimes carry it by a pair of arms or brackets pivoted upon the shaft carrying the roller C and the motion of which is limited by a suitable stop F².

The rollers C and D are connected, preferably, by toothed gearing, and the rollers C and F are connected in like manner. The roller E is driven by chain gearing from the shaft of the roller D, so as to rotate in the same direction as the latter roller, and from E motion is similarly transmitted to the roller G, which in turn drives the roller K in the same direction by similar means. Thus the rollers E, F, G, and K all rotate in the same direction, as indicated at Fig. 1.

The machine is driven either by manual power or by a motor through the medium of belts running on the fast and loose pulleys L L' or other power-transmitting appliances.

The roller K is supported by the suspension arms or brackets M M', each bracket having a projection, as $m$ and $m'$, respectively fitted with a small roller $m^2$ at the outer end. Such rollers are kept in contact with the peripheries of the cams H and H', respectively, by the tension of a spring N. The shaft carrying the cams H H' is rotated in the direction indicated in Fig. 1 by suitable means, such as a ratchet-and-pawl mechanism, as illustrated, which is operated from a crank-disk O. The crank-disk has two crank-pin eyes or apertures at unequal distances from the center of the shaft on which it is mounted for the purpose of imparting either a long or short stroke to the connecting-rod O', according to the speed at which it is desired to rotate the cams H H' relatively to the speed of the dough-rollers.

The cams H H' are gapped, as illustrated at $H^\times$, to permit the spring N to withdraw the roller K (together with the suspended brackets by which it is supported) to the position indicated at Fig. 3, so as to allow the molded roll of dough P to fall out of the coiling-space and so to automatically discharge itself from the machine. The cams H H' are made of such a diameter and are rotated at such a speed as to bring their gaps into position to enable the spring N to withdraw the roller K simultaneously with the complete formation of each roll of dough.

Adjustable bearings are sometimes provided for the roller C or D to permit of a slight adjustment of the distance between such rollers to suit the dough to be molded.

The rollers are either of a plain form, as illustrated, or have corrugated or like surfaces to produce rolls of dough of fancy shapes.

The working of the machine is as follows: The weighed-out portion of dough to be molded is placed in a hopper formed by a cross-plate J at the mouth or the entering side of the rollers C D, and as such rollers are rotated in the directions shown in Fig. 1 the dough is carried through them and passed forward as a sheet onto the lower roll E and from thence to the roller K, which directs it onto the upper roller G. The roller G causes the sheet of dough to return toward the hopper until it is brought into contact with the roller F, which again diverts the dough and so compels it to coil upon itself, and thus form a roll. The direction of the dough through the machine and the coiling of the same into a roll in the space between the rollers E, F, G, and K are indicated by the thick dotted line at Fig. 1. After the filling of the normal space between the coiling-rollers E F G K the further increase or growth of the roll of dough will raise or tend to raise the roller F, and as the latter is loaded to a suitable weight the dough will be compressed or molded into a solid roll, which when the roller K is drawn to one side by the spring N will fall out of the machine, as shown in Fig. 3.

What I claim is—

A dough-molding machine comprising a frame, rollers C, D, E F G arranged as described and mounted to rotate in said frame, the roller F being geared to the roller C and capable of moving upward about the axis thereof, a roller K, arms supporting said roller below the coiling space or cavity formed between the rollers E F G, means substantially as described for rotating said rollers in the directions set forth, and means substantially as described for holding said roller K in position below said coiling space or cavity and for withdrawing it at intervals from below said space or cavity, all substantially as described for the purposes set forth.

Signed at Preston, in the county of Lancaster, this 9th day of August, 1898.

CHRISTOPHER DOBSON.

Witnesses:
T. H. CLARKE,
M. LUTENER.